US012742545B2

(12) United States Patent
Coleman et al.

(10) Patent No.: US 12,742,545 B2
(45) Date of Patent: Sep. 22, 2026

(54) METHODS AND SYSTEMS FOR MIXING FLUIDS

(71) Applicant: EKONA POWER INC., Burnaby (CA)

(72) Inventors: Tim Coleman, Port Moody (CA); Kenneth William Kratschmar, Vancouver (CA); David Aaron Leboe, Vancouver (CA); Christopher Edwin John Reid, Vancouver (CA)

(73) Assignee: EKONA POWER INC., Burnaby (CA)

( * ) Notice: Subject to any disclaimer, the term of this patent is extended or adjusted under 35 U.S.C. 154(b) by 722 days.

(21) Appl. No.: 18/059,313

(22) Filed: Nov. 28, 2022

(65) Prior Publication Data

US 2023/0184428 A1 Jun. 15, 2023

Related U.S. Application Data

(60) Provisional application No. 63/288,068, filed on Dec. 10, 2021.

(51) Int. Cl.
*F23D 14/22* (2006.01)
*B01F 23/10* (2022.01)
(Continued)

(52) U.S. Cl.
CPC ............ *F23D 14/22* (2013.01); *B01F 23/191* (2022.01); *B01F 25/3142* (2022.01); *B01F 25/3143* (2022.01); *B01F 25/70* (2022.01); *B01F 35/2211* (2022.01); *B01F 35/718051* (2022.01); *F23N 1/025* (2013.01); *B01F 2101/501* (2022.01); *B01F 2215/0422* (2013.01); *B01F 2215/0427* (2013.01);
(Continued)

(58) Field of Classification Search
CPC .... F23D 14/22; B01F 35/718; B01F 35/2211; B01F 25/3143; B01F 25/70; B01F 25/3142; B01F 25/23; B01F 23/191; F23N 1/025
USPC .................................................. 431/11; 137/3
See application file for complete search history.

(56) References Cited

U.S. PATENT DOCUMENTS 2,529,598 A 11/1950 Deanesly
2,813,138 A 11/1957 Macqueen
(Continued)

FOREIGN PATENT DOCUMENTS

CN 113124420 A 7/2021
DE 102011116503 A1 4/2013
(Continued)

OTHER PUBLICATIONS https://www.fireandsafetycentre.co.uk/blogs/safety-storage/auto-ignition-temperature?srsltid=AfmBOorugP1_0PMP11Fp8F8ItTqA7WyGOezrcGQQwzYCd_mZiy5IVHAC.*

*Primary Examiner* — Vivek K Shirsat
(74) *Attorney, Agent, or Firm* — D'Ambrosio & Menon, PLLC; Usha Menon

(57) ABSTRACT

A mixing chamber is loaded with a first fluid. While a volume of the first fluid within the mixing chamber is constant, first and second streams of a second fluid are injected into the mixing chamber along first and second injection directions. As a result of injecting the first and second streams of the second fluid into the mixing chamber, the first and second streams of the second fluid impinge one another so as to generate within the mixing chamber at least one further stream of the second fluid that mixes with the first fluid and that flows in a direction different to the first and second injection directions.

26 Claims, 8 Drawing Sheets

Mixing

(51) Int. Cl.

| | |
|---|---|
| ***B01F 25/314*** | (2022.01) |
| ***B01F 25/70*** | (2022.01) |
| ***B01F 35/221*** | (2022.01) |
| ***B01F 35/71*** | (2022.01) |
| ***B01F 101/00*** | (2022.01) |
| ***F23N 1/02*** | (2006.01) |

(52) U.S. Cl.

CPC ................. *B01F 2215/0472* (2013.01); *F23C 2900/9901* (2013.01); *F23N 2221/06* (2020.01)

(56) References Cited

U.S. PATENT DOCUMENTS

| | | | | |
|---|---|---|---|---|
| 2,897,062 | A | 7/1959 | Minarik | |
| 3,098,883 | A | 7/1963 | Otto et al. | |
| 3,185,740 | A | 5/1965 | Malick | |
| 4,480,925 | A | 11/1984 | Dietrich | |
| 4,676,744 | A * | 6/1987 | Wray | F23D 14/22 431/170 |
| 5,180,300 | A * | 1/1993 | Hovis | F23C 9/00 431/115 |
| 5,886,056 | A | 3/1999 | Hershkowitz et al. | |
| 5,935,489 | A | 8/1999 | Hershkowitz et al. | |
| 5,980,596 | A | 11/1999 | Hershkowitz et al. | |
| 6,984,372 | B2 | 1/2006 | Randhava et al. | |
| 7,494,265 | B2 | 2/2009 | Niermeyer et al. | |
| 8,524,175 | B2 | 9/2013 | Pawlak et al. | |
| 9,822,970 | B2 * | 11/2017 | Hirano | F27B 3/002 |
| 10,486,131 | B2 | 11/2019 | Girgis et al. | |
| 2004/0257907 | A1 | 12/2004 | Xu et al. | |
| 2010/0042044 | A1 | 2/2010 | Middleton et al. | |
| 2013/0340162 | A1 | 12/2013 | Peel | |
| 2015/0053400 | A1 | 2/2015 | Van Hal et al. | |
| 2020/0283294 | A1 | 9/2020 | Kawamoto et al. | |

FOREIGN PATENT DOCUMENTS

| | | | |
|---|---|---|---|
| EP | 0767704 | | 4/1997 |
| FR | 428010 | A | 8/1911 |
| JP | 2001-139303 | A | 5/2001 |
| JP | 2008-514428 | A | 5/2008 |
| JP | 2009-107613 | A | 5/2009 |
| WO | 1996000126 | A1 | 1/1996 |
| WO | 1998049093 | | 11/1998 |
| WO | 2004035187 | | 4/2004 |
| WO | 2020/118417 | A | 6/2020 |

* cited by examiner

| Angle to Interior Wall | Angle of Intersection | Intersection Distance |
|---|---|---|
| 90 | 180 | 0 x D |
| 60 | 120 | 0.57 x D |
| 30 | 60 | 1.0 x D |
| 10 | 20 | 2.88 x D |
| 5 | 10 | 5.73 x D |

METHODS AND SYSTEMS FOR MIXING FLUIDS

CROSS REFERENCE TO RELATED APPLICATION(S)

This application is related to and claims priority to U.S. Provisional Patent Application No. 63/288,068 filed on Dec. 10, 2021, the contents of which are incorporated by reference herein.

FIELD OF THE DISCLOSURE

The present disclosure relates to methods and systems for mixing fluids.

BACKGROUND TO THE DISCLOSURE

Feedstock pyrolysis is a method of chemically decomposing a feedstock gas using heat of combustion. For example, a combustion gas may be ignited and mixed with the feedstock gas. Heat from the combustion products may mix with the feedstock gas and cause decomposition of the feedstock gas. In order for the decomposition to be made more efficient, it is important for the combustion products to be well mixed with the feedstock gas.

SUMMARY OF THE DISCLOSURE

According to a first aspect of the disclosure, there is provided a method of mixing a first fluid with a second fluid, comprising: loading a mixing chamber with a first fluid; and while a volume of the first fluid within the mixing chamber is constant: injecting a first stream of the second fluid into the mixing chamber along a first injection direction; and injecting a second stream of the second fluid into the mixing chamber along a second injection direction that intersects the first injection direction, wherein, as a result of injecting the first and second streams of the second fluid into the mixing chamber, the first and second streams of the second fluid impinge one another so as to generate within the mixing chamber at least one further stream of the second fluid that mixes with the first fluid and that flows in a direction different to the first and second injection directions.

The at least one further stream of the second fluid generally comprises the second fluid. However, the at least one further stream is not necessarily limited to the second fluid and may, for example, comprise both the second fluid and some of the first fluid that is entrained in the at least one further stream.

The direction of flow of the at least one further stream of the second fluid may be perpendicular to the first and second injection directions.

A volume of the mixing chamber may be fixed.

The first injection direction may intersect the second injection direction at an angle of about 180 degrees.

The mixing chamber may define a longitudinal axis, and the first and second injection directions may be perpendicular to the longitudinal axis.

The first injection direction may intersect the second injection direction at an angle of about 180 degrees.

The first injection direction may intersect the second injection direction at an angle of from 10 to 180 degrees.

The first injection direction may intersect the second injection direction at an angle of about 140 to 180 degrees.

The first injection direction may intersect the second injection direction at an angle of about 160 degrees.

Injecting the first stream into the mixing chamber may comprise injecting the first stream from a first fluid injector. Injecting the second stream into the mixing chamber comprises injecting the second stream from a second fluid injector. The method may further comprise: injecting from the first fluid injector a third stream of the second fluid into the mixing chamber along a third injection direction; and injecting from the second fluid injector a fourth stream of the second fluid into the mixing chamber along a fourth injection direction that intersects the third injection direction. The first injection direction may intersect the second injection direction at an angle of about 180 degrees. The third injection direction may intersect the fourth injection direction at an angle of from 10 to 180 degrees.

The method may further comprise: injecting from the first fluid injector a fifth stream of the second fluid into the mixing chamber along a fifth injection direction; and injecting from the second fluid injector a sixth stream of the second fluid into the mixing chamber along a sixth injection direction that intersects the fifth injection direction. The fifth injection direction may intersect the sixth injection direction at an angle of from 10 to 180 degrees.

Injecting the first stream into the mixing chamber may comprise injecting the first stream from a first fluid injector. Injecting the second stream into the mixing chamber may comprise injecting the second stream from a second fluid injector. The method may further comprise injecting from a third fluid injector a third stream of the second fluid into the mixing chamber. The third fluid injector may be adjacent the first fluid injector and spaced from the first fluid injector by a distance of about 2-20 times a diameter of the mixing chamber.

The distance may be about 10 times the diameter of the mixing chamber.

The method may further comprise: injecting a third stream of the second fluid into the mixing chamber; and injecting a third stream of the second fluid into the mixing chamber. As a result of injecting the third and fourth streams of the second fluid into the mixing chamber, the third and fourth streams of the second fluid may impinge one another so as to generate within the mixing chamber at least one further stream of the second fluid that: mixes with the first fluid and flows in a direction different to the third and fourth injection directions; and impinges the at least one further stream generated by the impingement of the first and second streams of the second fluid.

The first fluid may comprise a hydrocarbon.

The hydrocarbon may be methane or natural gas.

The second fluid may comprise one or more of: carbon monoxide; methane; hydrogen; oxygen; air; carbon dioxide; and water.

The second fluid may comprise one or more of: carbon monoxide; carbon dioxide; and water.

The first fluid may comprise a hydrocarbon. The second fluid may comprise an oxidant. After loading the mixing chamber with the first fluid and before injecting the first and second streams of the second fluid into the mixing chamber, a temperature of the first fluid may be at least a temperature required for autoignition of the first fluid in the presence of the second fluid.

The oxidant may be oxygen or air.

The first fluid may comprise methane, the oxidant is air, and the temperature required for autoignition may be at least 850 K.

The first fluid may comprise hydrogen, the oxidant may be air, and the temperature required for autoignition may be at least 770 K.

The first fluid may comprise carbon monoxide, the oxidant may be air, and the temperature required for autoignition may be at least 880 K.

Injecting the first and second streams of the second fluid into the mixing chamber may comprise: combusting a combustible gas in one or more combustion chambers connected to the mixing chamber, thereby forming the second fluid; and injecting the first and second streams of the second fluid into the mixing chamber.

Injecting the first stream into the mixing chamber may comprise injecting the first stream from a first fluid injector. Injecting the second stream into the mixing chamber may comprise injecting the second stream from a second fluid injector. The first and second fluid injectors may be offset from one another such that, in response to the first and second streams of the second fluid impinging one another, vorticity is introduced in one or more of the first stream, the second stream, and the at least one further stream of the second fluid to thereby improve mixing of the second fluid with the first fluid.

According to a further aspect of the disclosure, there is provided a system for mixing a first fluid with a second fluid, comprising: a mixing chamber having an inlet and an outlet; a first fluid flow channel defining a first injection direction into the mixing chamber; a second fluid flow channel defining a second injection direction into the mixing chamber; valving for controlling flow of the first and second fluids into the mixing chamber; and a controller configured to: control the valving so as to load the first fluid into the mixing chamber via the inlet; while a volume of the first fluid within the mixing chamber is constant: control the valving so as to inject via the first fluid flow channel a first stream of the second fluid into the mixing chamber along the first injection direction; control the valving so as to inject via the second fluid flow channel a second stream of the second fluid into the mixing chamber along the second injection direction, wherein, as a result of injecting the first and second streams of the second fluid into the mixing chamber, the first and second streams of the second fluid impinge one another so as to generate within the mixing chamber at least one further stream of the second fluid that mixes with the first fluid and that flows in a direction different to the first and second injection directions; and control the valving as to evacuate the mixed first and second fluids from the mixing chamber via the outlet.

The system may further comprise: one or more combustion chambers connected to the mixing chamber via the first and second fluid flow channels; and one or more igniters. Controlling the valving so as to inject the first and second streams of the second fluid into the mixing chamber may comprise: controlling the valving so as to load the one or more combustion chambers with a combustible gas; controlling the one or more igniters so as to combust the combustible gas and thereby form the second fluid.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Figure 1A:
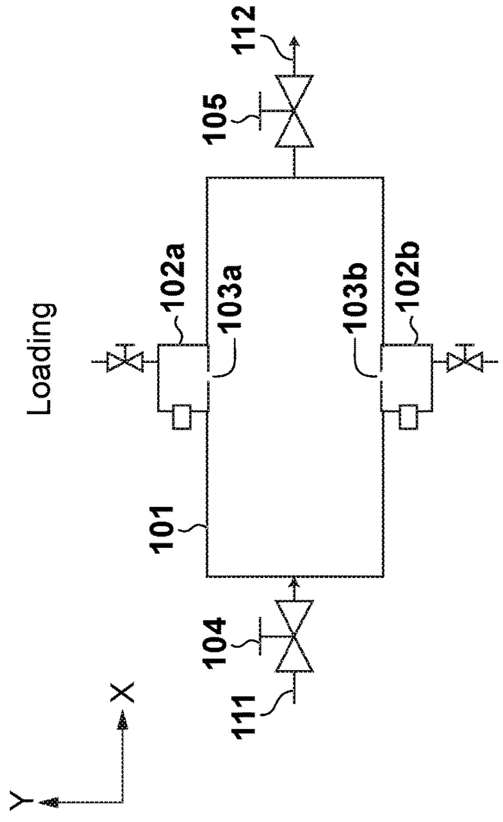
FIG. 1A is a schematic side-on view of a system for mixing a primary fluid with a secondary fluid, in a loading stage, according to an embodiment of the disclosure.
Figure 1B:
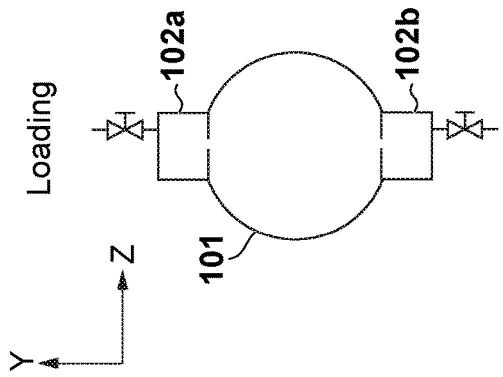
FIG. 1B is a schematic end-on view of the system of FIG. 1A.

The present disclosure seeks to provide improved methods and system for mixing fluids. While various embodiments of the disclosure are described below, the disclosure is not limited to these embodiments, and variations of these embodiments may well fall within the scope of the disclosure which is to be limited only by the appended claims.

Generally, according to embodiments of the disclosure, there are described methods and systems for mixing a primary fluid with a secondary fluid. For example, according to some embodiments, the primary fluid is loaded via an inlet valve into a mixing chamber which is then sealed. The mixing chamber includes a plurality of fluid injectors, including a first fluid injector and a second fluid injector, for injecting a secondary fluid into the mixing chamber. For example, with a cylindrical mixing chamber, the first and second fluid injectors may be diametrically opposed from one another. Each fluid injector includes one or more orifices (e.g. restrictors, nozzles, distributers, pathways, or other fluid flow channels) for directing the secondary fluid into the mixing chamber. Each orifice defines a respective injection direction into the mixing chamber. The injection direction of an orifice of the first fluid injector intersects the injection direction of an orifice of the second fluid injector.

According to some embodiments, the first and second fluid injectors do not need to be diametrically opposed from one another but may be oriented relative to the longitudinal axis of the mixing chamber such that the injection direction of a orifice of the first fluid injector intersects the injection direction of a orifice of the second fluid injector. According to still further embodiments, the first and second fluid injectors may be located at either end of the mixing chamber, with the first and second injection directions oriented parallel to the mixing chamber's longitudinal axis.

While the volume of the primary fluid within the mixing chamber is constant or motionless (e.g. the primary fluid is considered stationary), the secondary fluid is injected into the mixing chamber using the fluid injectors, so as to mix with the primary fluid. For example, before, during, or after the loading of the primary fluid into the mixing chamber, the secondary fluid may be loaded under pressure into the fluid injectors. In order to initiate injection of the secondary fluid into the mixing chamber, the orifices may be opened, thereby causing the secondary fluid to be injected into the mixing chamber along the injection directions defined by the orifices.

In particular, during the injection of the secondary fluid, a first stream of the secondary fluid is injected into the mixing chamber via an orifice of the first fluid injector, and a second stream of the second fluid into the mixing chamber via an orifice of the second fluid injector. Because of the intersection of the first and second injection directions, the first stream of secondary fluid collides with or otherwise impinges the second steam of secondary fluid. The impingement of the first and second streams of secondary fluid causes the directions of flow of the first and second streams to change from the first and second injection directions. The changing directions of flow of the first and second streams may cause improved mixing of the first and second streams of secondary fluid with the primary fluid.

It shall be understood that, in order for the first and second streams to impinge one another, the first and second streams should generally be injected into the mixing chamber with sufficient momentum such that the first and second streams reach one another and thereby impinge one another.

According to some embodiments, the injection directions define, relative to an interior wall of the mixing chamber, an angle in the range of 5°-90°. Consequently, the orifices may be oriented such that the first and second injection directions may intersect at an angle of about 180°, or in some cases less than 180°. According to some embodiments, the injection directions may intersect at an angle between about 10 degrees and about 180 degrees, and more particularly about 160 degrees. For example, according to some embodiments, the first and second injection directions may define, relative to an interior wall of the mixing chamber, angles of about 80 degrees, and may intersect one another at an angle of about 160 degrees. Preferably, the injection of the secondary fluid is not done tangentially to the interior wall of the mixing chamber, as this may potentially damage a liner covering the interior wall of the mixing chamber.

When injected into the mixing chamber, the streams of secondary fluid will generally adopt a cone-like shape as they expand outwardly after exiting the orifices. Therefore, due to the cone-like expansion of the stream, the stream will advance in many different directions, but the general direction of flow of the stream (i.e. the principal direction of flow) may be considered to be the "injection direction" as used herein. The injection direction may also be considered to be the direction along which the orifice points or is oriented. For example, the injection direction may be considered to be along an axis passing perpendicularly through a center of the orifice.

Furthermore, throughout this disclosure, when reference is made to a first injection direction intersecting a second injection direction, this should be interpreted as meaning that the stream of fluid travelling along the first injection direction at least partially, if not fully, impinges the stream of fluid travelling along the second injection direction. Therefore, while there may not be a full head-on collision between the two streams, at least some of the stream travelling along the first injection direction will impinge at least some of the stream travelling along the second injection direction, in part because of the respective cone-like expansions of the streams.

In this context, and according to some embodiments, the first fluid injector may be slightly offset relative to the second fluid injector so as to deliberately cause the principal directions of flow of the first and second streams to be offset from one another. In this case, while the first and second streams will not collide head-on, the first and second streams will still impinge each other due to the cone-like expansions of the streams as they are injected into the mixing chamber.

By offsetting the first and second fluid injectors such that they are not precisely diametrically opposed from one another, the non-direct impingement of the first stream with the second stream may induce vorticity in the first stream, the second stream, and/or the further stream that is generated as a result of the impingement of the first and second streams. Such vorticity or otherwise turbulent flow may facilitate the mixing of the second fluid with the first fluid.

Turning to FIGS. 1A-1D, there is shown a first embodiment of a system for mixing fluids. The system includes two fluid injectors 102*a*, 102*b* mounted onto a cylindrical mixing chamber 101. Fluid injectors 102*a*, 102*b* are fluidly connected to mixing chamber 101 via orifices 103*a*, 103*b*. According to some embodiments, orifices 103*a*, 103*b* are permanently open. According to other embodiments, orifices 103*a*, 103*b* may be open or closed (using, for example, suitable valves under control of a controller, such as a computer or the like) depending on whether or not the mixing stage has begun. Fluid injectors 102*a*, 102*b* are oriented such that orifices 103*a*, 103*b* are aligned in the X and Z directions. In particular, fluid injectors 102*a*, 102*b* (and, by extension, orifices 103*a*, 103*b*) are diametrically opposed from one another and relative to the longitudinal axis of mixing chamber 101.

During a loading stage, a primary fluid 111 is introduced into mixing chamber 101 via an inlet valve 104. During the loading stage, any fluids 112 remaining with mixing chamber 101 (such as mixed fluids from a previous mixing cycle, as described in further detail below), are expelled through an outlet valve 105. Following the expulsion of mixed fluids 112, inlet valve 104 and outlet valve 105 are both closed, thereby sealing mixing chamber 101. At the end of the loading stage, mixing chamber 101 is completely filled with primary fluid 111, and primary fluid 111 has no motion relative to mixing chamber 101. As such, primary fluid 111 may be described as being stationary.

Subsequent to the loading stage, during a mixing stage, a secondary fluid 113 is introduced under pressure into fluid injectors 102*a*, 102*b* via secondary valves 106*a*, 106*b*. According to other embodiments, secondary fluid 113 may be introduced into fluid injectors 102*a*, 102*b* before or during the loading of primary fluid 111 into mixing chamber 101. In order to initiate mixing, orifices 103*a*, 103*b* are opened, resulting in streams of secondary fluid 113 passing through orifices 103*a*, 103*b* and travelling into mixing chamber 101 along injection directions 118*a* and 118*b* defined by orifices 103*a*, 103*b*. The streams of secondary fluid 113 impinge on each other centrally within mixing chamber 101. The impingement of the streams of secondary fluid 113 causes their directions of flow to change, thereby allowing the streams of secondary fluid 113 to better mix with stationary primary fluid 111.

Figure 1C:
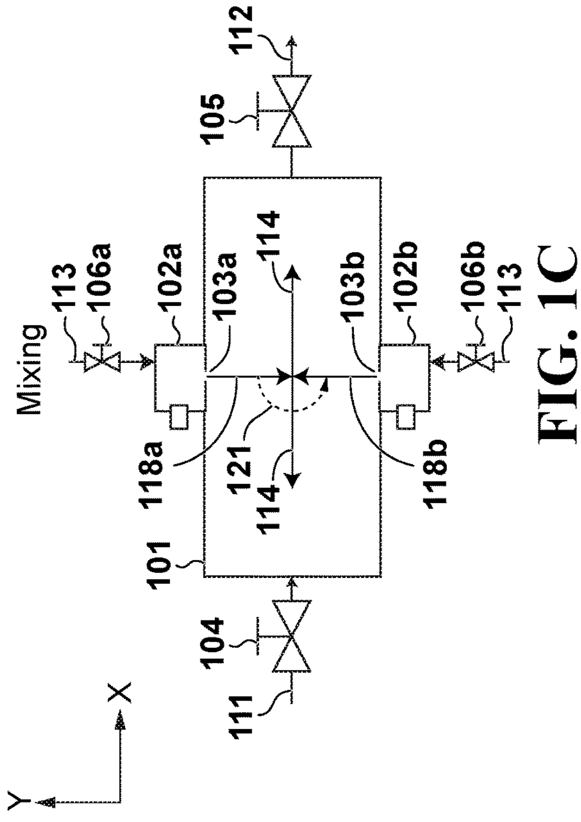
FIG. 1C is a schematic side-on view of the system of FIG. 1A in a mixing stage, according to an embodiment of the disclosure.
Figure 1D:
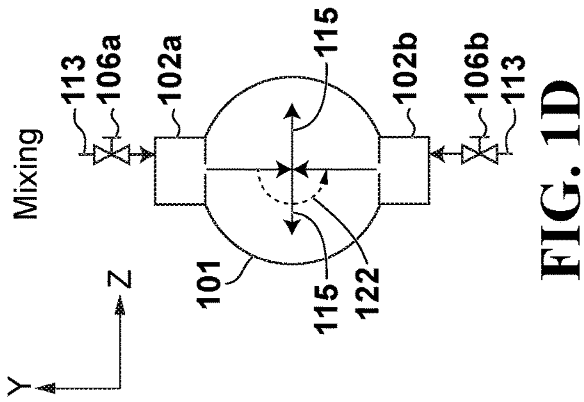
FIG. 1D is a schematic end-on view of the system of FIG. 1C.

For example, as can be seen in FIGS. 1C and 1D, the streams of secondary fluid 113 mix with stationary primary fluid 111 along at least the X direction 114 and the Z direction 115, in a generally circular fashion. The angle 121 of the stream originating from orifice 103*a* as it enters mixing chamber 101, relative to the stream originating from orifice 103*b* as it enters mixing chamber 101, in the X-Y plane, is 180 degrees. The angle 122 of the stream originating from orifice 103*a* as it enters mixing chamber 101, relative to the stream originating from orifice 103*b* as it enters mixing chamber 101, in the Y-Z plane, is 180 degrees. At the end of the mixing stage, mixing chamber 101 is filled with mixed fluid 112, comprising a mixture of primary fluid 111 and secondary fluid 113.

Figure 2B:
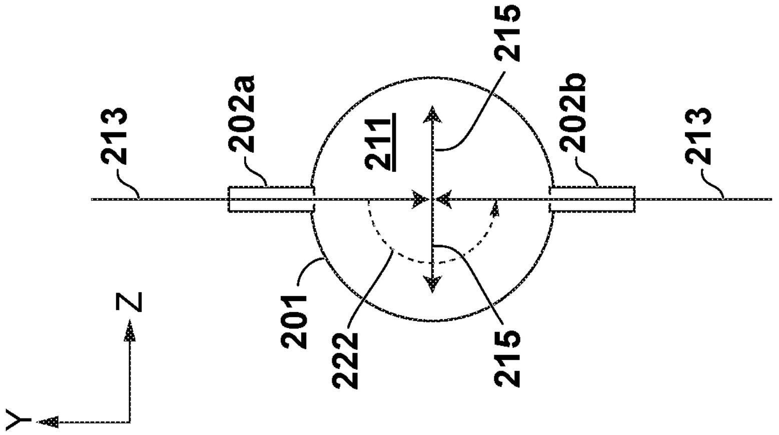
FIG. 2B is a schematic end-on view of the system of FIG. 2A.
Figure 2A:
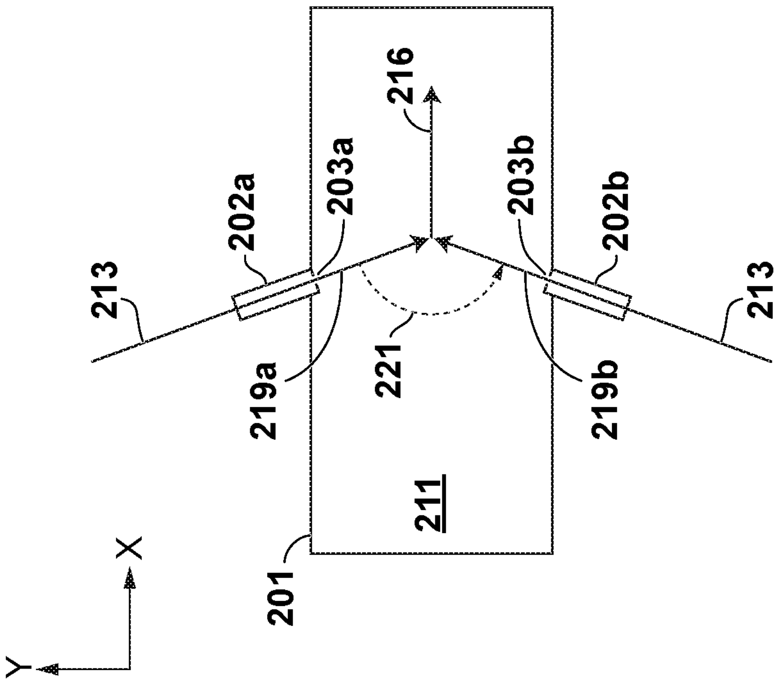
FIG. 2A is another schematic side-on view of a system for mixing a primary fluid with a secondary fluid, with angled fluid injectors, according to an embodiment of the disclosure.

Turning to FIGS. 2A and 2B, there is shown another embodiment of a system for mixing fluids. The system includes two fluid injectors 202*a*, 202*b* mounted onto a cylindrical mixing chamber 201. Fluid injectors 202*a*, 202*b* are fluidly connected to mixing chamber 201 via orifices 203*a*, 203*b* which may be open or closed (using, for example, suitable valves) depending on whether or not the mixing stage has begun. While fluid injectors 202*a*, 202*b* are diametrically opposed to one another, fluid injectors 202*a*, 202*b* are oriented relative to the longitudinal axis of mixing chamber 201 such that orifices 203*a*, 203*b* are oriented at a non-normal angle relative to the longitudinal axis of mixing chamber 201, as described in further detail below.

The system of FIGS. 2A and 2B undergoes a loading stage similar to the system of FIGS. 1A-1D. Therefore, for clarity's sake, certain elements have been omitted from the system of FIG. 2A and 2B, such as the valves. During the mixing stage of the system of FIG. 2A and 2B, streams of secondary fluid 213 pass through orifices 203*a*, 203*b* and travel into mixing chamber 201 along injection directions 219*a* and 219*b* defined by orifices 203*a*, 203*b*. The streams of secondary fluid 213 impinge on each other within mixing chamber 201. The impingement of the streams of secondary fluid 213 causes their directions of flow to change, thereby allowing the streams of secondary fluid 213 to better mix with stationary primary fluid 211.

The angle 221 of the stream originating from orifice 203*a* as it enters mixing chamber 201, relative to the stream originating from orifice 203*b* as it enters mixing chamber 201, in the X-Y plane, is less than 180 degrees. The angle 222 of the stream originating from orifice 203*a* as it enters mixing chamber 201, relative to the stream originating from orifice 203*b* as it enters mixing chamber 201, in the Y-Z plane, is 180 degrees. The impingement of the streams of secondary fluid 213 causes their directions of flow to change, thereby allowing the streams of secondary fluid 213 to mix with stationary primary fluid 211. Specifically, the streams of secondary fluid 213 principally mix with primary fluid 211 in one direction 216 in the X-Y plane, direction 216 being aligned with the longitudinal axis of mixing chamber 201. Furthermore, the streams of secondary fluid 213 principally mix with primary fluid 211 in two directions 215 in the Y-Z plane, directions 215 being perpendicular to the longitudinal axis of mixing chamber 201.

The angles 221 and 222 may be adjusted by configuring fluid injectors 202*a*, 202*b* such that orifices 203*a*, 203*b* are oriented at different angles relative to the longitudinal axis of mixing chamber 201.

Figure 3B:
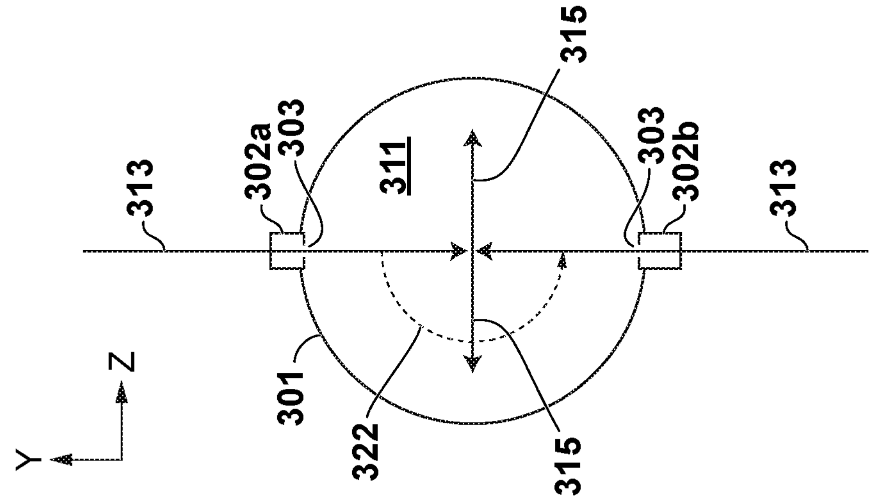
FIG. 3B is a schematic end-on view of the system of FIG. 3A.
Figure 3A:
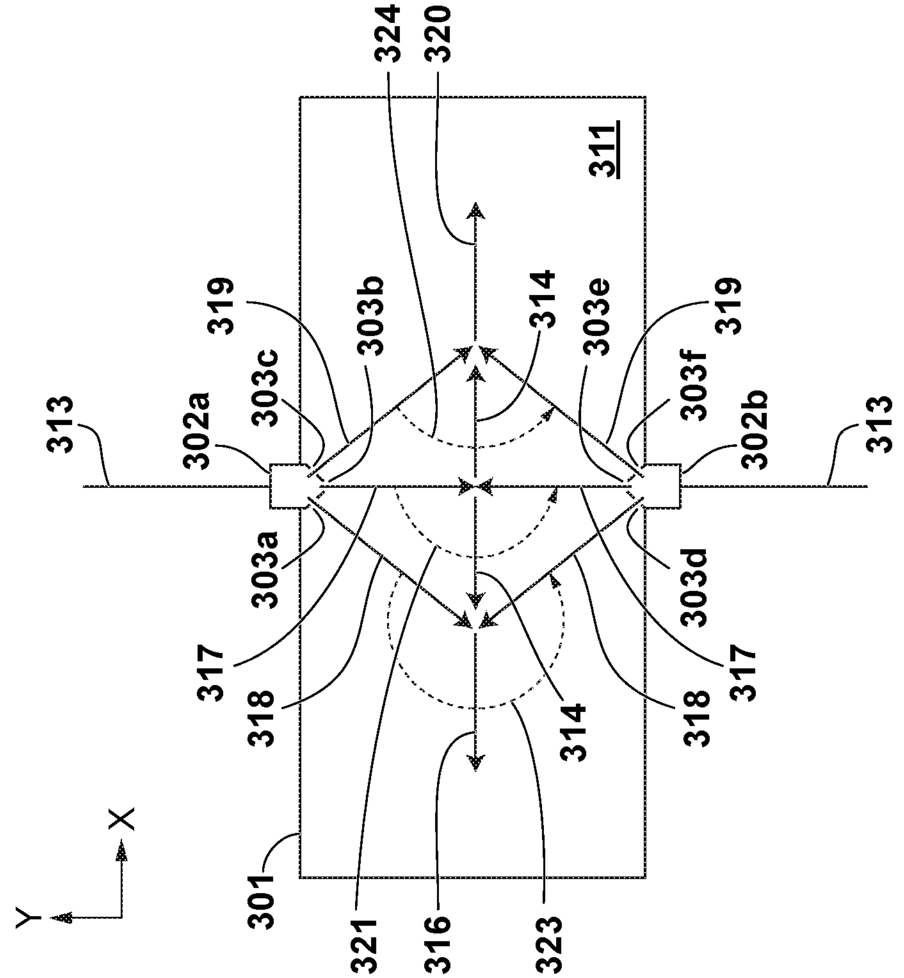
FIG. 3A is a schematic side-on view of a system for mixing a primary fluid with a secondary fluid, according to another embodiment of the disclosure.

Turning to FIGS. 3A and 3B, there is shown another embodiment of a system for mixing fluids. The system includes two fluid injectors 302*a*, 302*b* mounted onto a cylindrical mixing chamber 301. Fluid injectors 302*a*, 302*b* are fluidly connected to mixing chamber 301 via orifices 303*a*, 303*b*, 303*c*, 303*d*, 303*e*, 303*f* which may be open or closed (using, for example, suitable valves) depending on whether or not the mixing stage has begun. While fluid injectors 302*a*, 302*b* are diametrically opposed to one another, fluid injectors 302*a*, 302*b* each include two orifices that are angled relative to the longitudinal axis of mixing chamber 301, and one orifice that is oriented perpendicular to the longitudinal axis of mixing chamber 301.

The system of FIGS. 3A and 3B undergoes a loading stage similar to the system of FIGS. 1A-1D. Therefore, for clarity's sake, certain elements have been omitted from the system of FIGS. 3A and 3B, such the valves. During the mixing stage of FIGS. 3A and 3B, streams 317, 318, 319 of secondary fluid 313 pass through orifices 303*a*, 303*b*, 303*c* and travel into mixing chamber 301 along the injection directions defined by orifices 303*a*, 303*b*, 303*c*. The streams 317, 318, 319 impinge on each other within mixing chamber 301. The impingement of the streams 317, 318, 319 causes their directions of flow to change, thereby allowing streams 317, 318, 319 to better mix with stationary primary fluid 311.

The angles 321 and 322 of stream 317 originating from the upper injector 302*a* as it enters mixing chamber 301, relative to stream 317 originating from the lower injector 302*b* as it enters mixing chamber 301, in the X-Y plane and in the Y-Z planes, are 180 degrees. The angle 323 of stream 318 originating from the upper injector 302*a* as it enters mixing chamber 301, relative to of stream 318 originating from the lower injector 302*b* as it enters mixing chamber 301, in the X-Y plane, is greater than 180 degrees. The angle 324 of stream 319 originating from the upper injector 302*a* as it enters mixing chamber 301, relative to stream 319 originating from the lower injector 302*b* as it enters mixing chamber 301, in the X-Y plane, is less than 180 degrees. The impingement of streams 317, 318, 319 causes their directions of flow to change, thereby allowing streams 317, 318, 319 to mix with stationary primary fluid 311. Specifically, streams 317 principally mix with primary fluid 311 in two directions 314 in the X-Y plane, direction 314 being parallel to the longitudinal axis of mixing chamber 301. Furthermore, streams 318 principally mix with primary fluid 311 in one direction 316 in the X-Y plane, and streams 319 principally mix with primary fluid 311 in one direction 320 in the X-Y plane, directions 316 and 320 being parallel to the longitudinal axis of mixing chamber 301. Further still, streams 317, 318, 319 principally mix with primary fluid 311 in two directions 315 in the Y-Z plane, directions 315 being perpendicular to the longitudinal axis of mixing chamber 301. Generally, streams 314, 316, and 320 adopt a generally circular shape.

According to some embodiments, additional secondary fluid streams can be added to those in FIGS. 3A and 3B 3 (for example, by adding further orifices to fluid injectors 302*a*, 302*b*) to optimize the mixing between secondary fluid 313 and stationary primary fluid 311

Turning to FIGS. 4A-4D, there is shown an embodiment of a system for producing hydrogen and solid carbon using a pulsed methane pyrolysis process. The system of FIGS. 4A-4D mixes fluids using methods as described herein, for improving the pulsed methane pyrolysis process. As can be seen from FIG. 4A, combustion chambers 402*a*, 402*b* are mounted onto a cylindrical mixing chamber 401. Combustion chambers 402*a*, 402*b* are fluidly connected to mixing chamber 401 via orifices 403*a*, 403*b*, 403*c*, 403*d*, 403*e*, 403*f* which may be open or closed (using, for example, suitable valves) depending on whether or not the mixing stage has begun. While combustion chambers 402*a*, 402*b* are diametrically opposed to one another, combustion chambers 402*a*, 402*b* each include two orifices that are angled relative to the longitudinal axis of mixing chamber 401, and one orifice that is oriented perpendicular to the longitudinal axis of mixing chamber 401, much like the system seen in FIGS. 3A and 3B.

During a loading stage, a feedstock gas such as natural gas or methane, ethane, propane, or some other hydrocarbon 411 is introduced into mixing chamber 401 via an inlet valve 404. During the loading stage, any products 412 and unreacted feedstock remaining within mixing chamber 401 from the previous cycle are expelled through an outlet valve 405. Following the expulsion of products 412, inlet valve 404 and outlet valve 405 are both closed, thereby sealing mixing chamber 401. At the same time, a gas mixture containing a fuel and oxidant 413 is introduced into combustion chambers 402*a*, 402*b* via supply valves 406. Once combustion chambers 402*a*, 402*b* are full of gas mixture 413, supply valves 406 are closed. At the end of the loading stage, combustion chambers 402*a*, 402*b* are filled with gas mixture 413, mixing chamber 401 is completely filled with feedstock 411, and feedstock 411 has no motion relative to mixing chamber 401. As such, feedstock 411 may be described as being stationary.

Figure 4A:
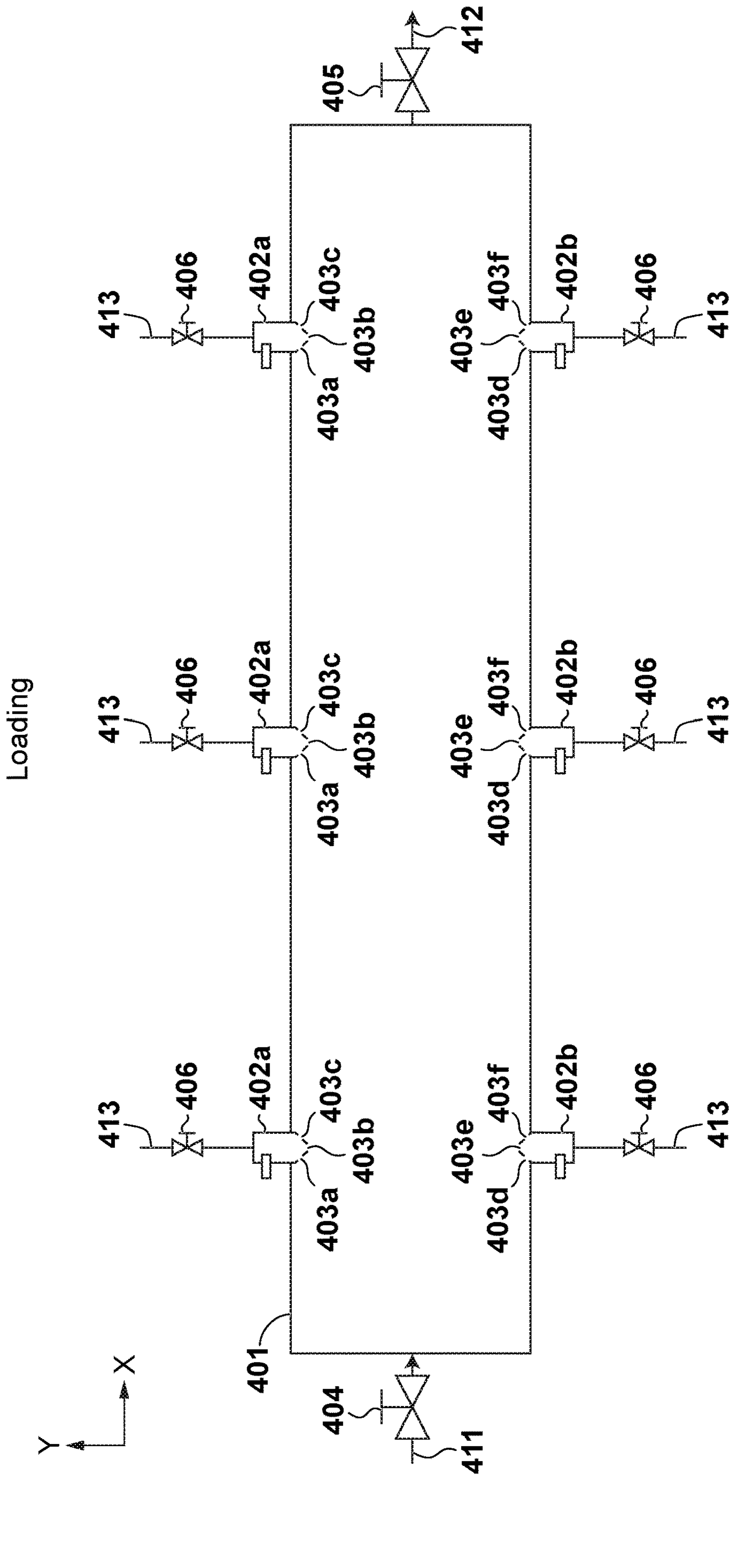
FIG. 4A is a schematic side-on view of a system for performing feedstock pyrolysis, in a loading stage, according to an embodiment of the disclosure.
Figure 4B:
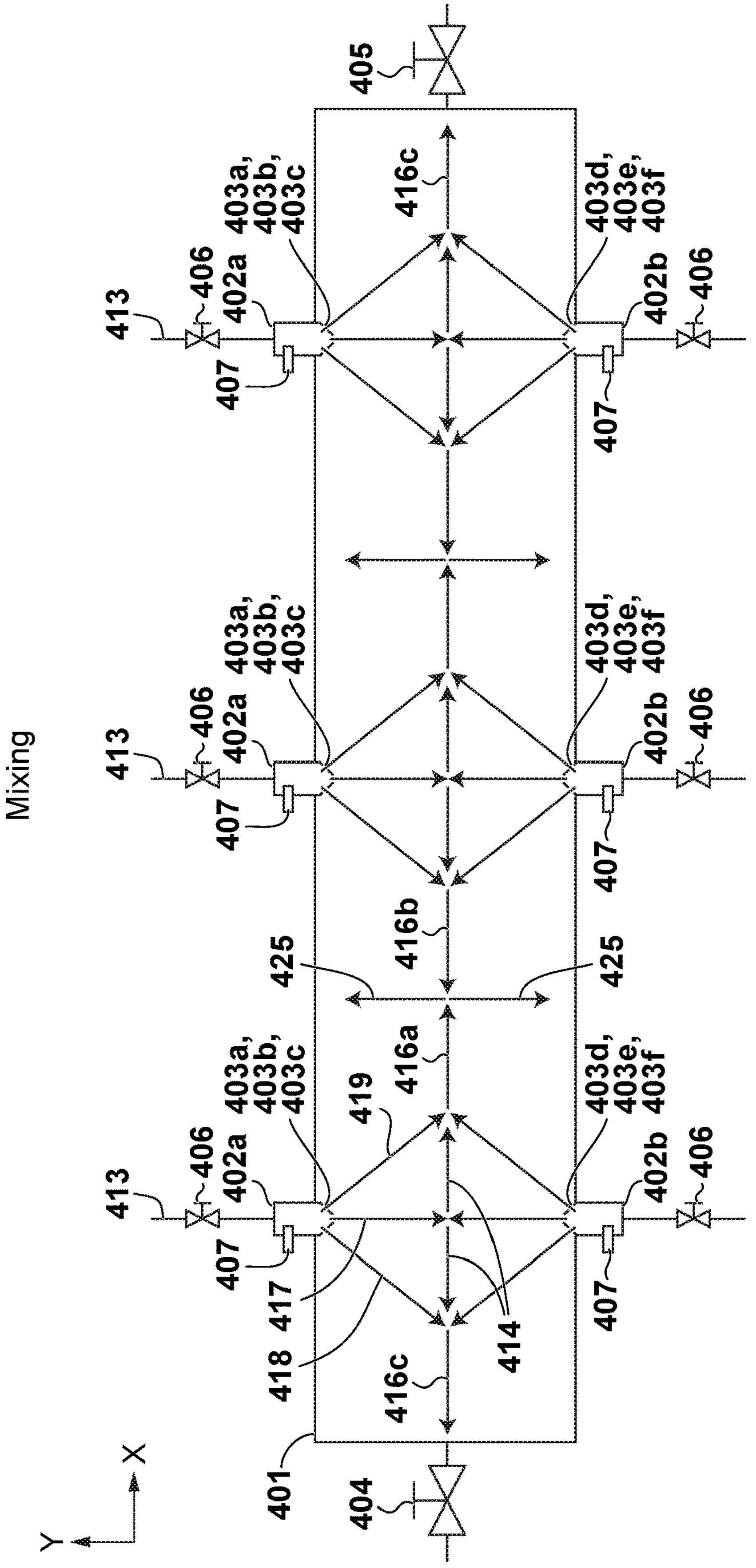
FIG. 4B is a schematic side-on view of the system of FIG. 4A, in a mixing stage.

During the mixing stage as seen in FIG. 4B, the gas mixture 413 is ignited using ignitors 407 to create a combusted gas which causes the temperature and pressure within combustion chambers 402*a*, 402*b* to increase. Orifices 403*a-f* are opened and, due to the difference in pressure between combustion chambers 402*a*, 402*b* and mixing chamber 401, streams 417, 418, 419 of combustion product gas pass through orifices 403*a-f* and travel into mixing chamber 401 along the injection directions defined by orifices 403*a-f*. Streams 417, 418, 419 impinge on each other within mixing chamber 401. The impingement of streams 417, 418, 419 causes their directions of flow to change, thereby allowing streams 417, 418, 419 to better mix with feedstock gas 411. In particular, streams 417, 418, 419 mix with feedstock gas 411 in a similar fashion to the mixing of the secondary fluid and primary fluid described above in connection with FIGS. 3A and 3B.

The spacing between combustion chambers 402*a*, 402*b* is sufficient to allow a combusted gas stream 416*a*, directed along the longitudinal axis of mixing chamber 401 toward outlet valve 405, to impinge on a combusted gas stream 416*b* directed along the longitudinal axis of mixing chamber 401 toward inlet valve 404. For example, according to some embodiments, the spacing between combustion chambers 402*a*, 402*b* is about ten times the diameter of mixing chamber 401. This impingement of combusted gas stream 416*a* with combusted gas stream 416*b* promotes further mixing with feedstock 411, by resulting in movement of combustion gas in two directions 425 perpendicular to the longitudinal axis of mixing chamber 401. The spacing between combustion chambers 402*a*, 402*b* at the ends of mixing chamber 401 is sufficient to allow combusted gas stream 416*c* to effectively mix with feedstock gas 411 in these areas. Generally, streams 414 and 416 adopt a generally circular shape.

Generally, the mixing of combusted gas streams 416*a*, 416*b*, 416*c* with feedstock 411 enables more efficient transfer of the combustion energy from combustion chambers 402*a*, 402*b* into feedstock gas 411, causing the pressure and temperature of feedstock gas 411 to rise. At the end of the mixing stage, mixing chamber 401 contains a mixture of feedstock gas 411 and combusted gases from combustion chambers 402*a*, 402*b*.

Figure 4C:
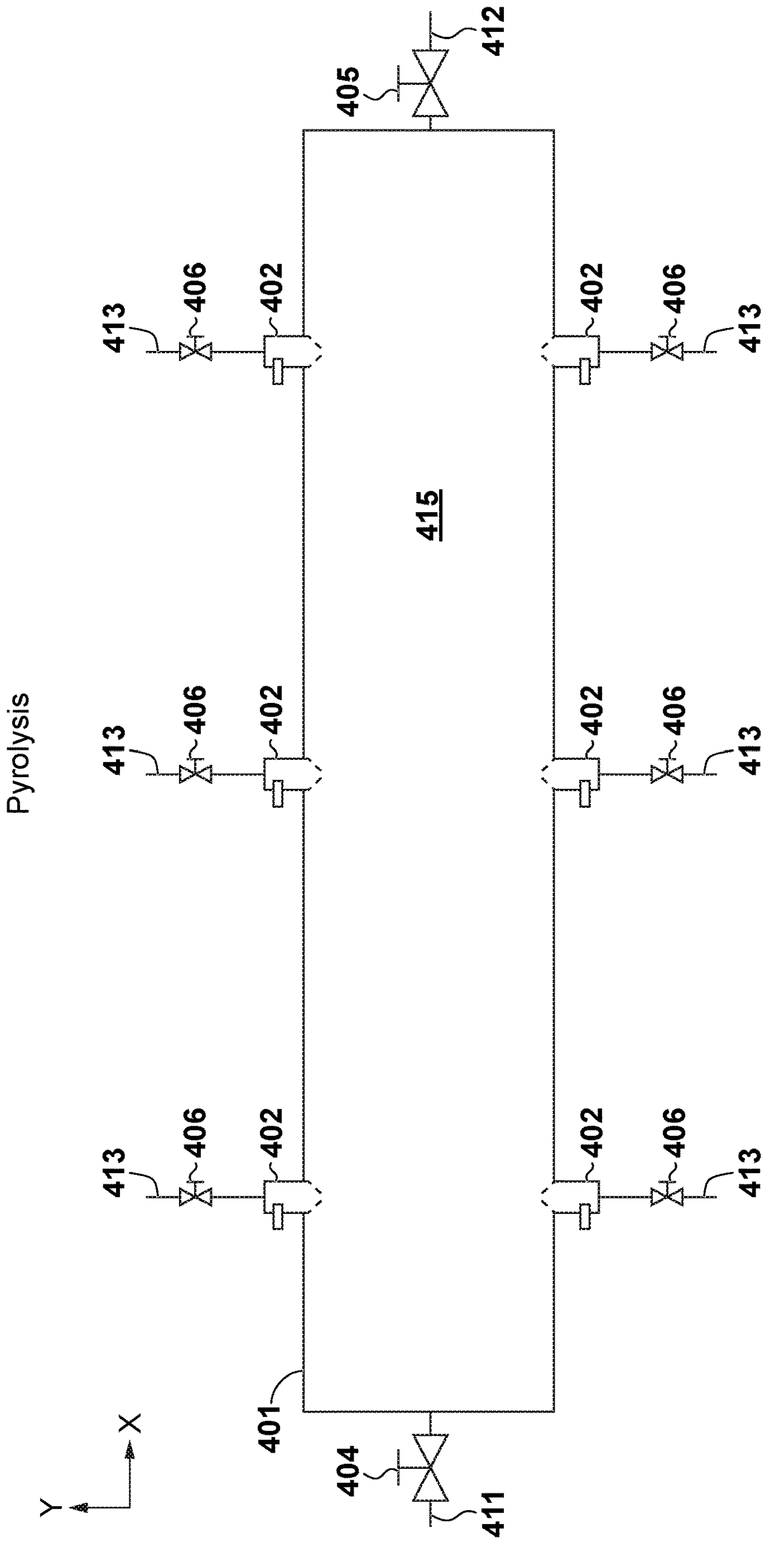
FIG. 4C is a schematic side-on view of the system of FIG. 4A, in a pyrolysis stage.
Figure 4D:
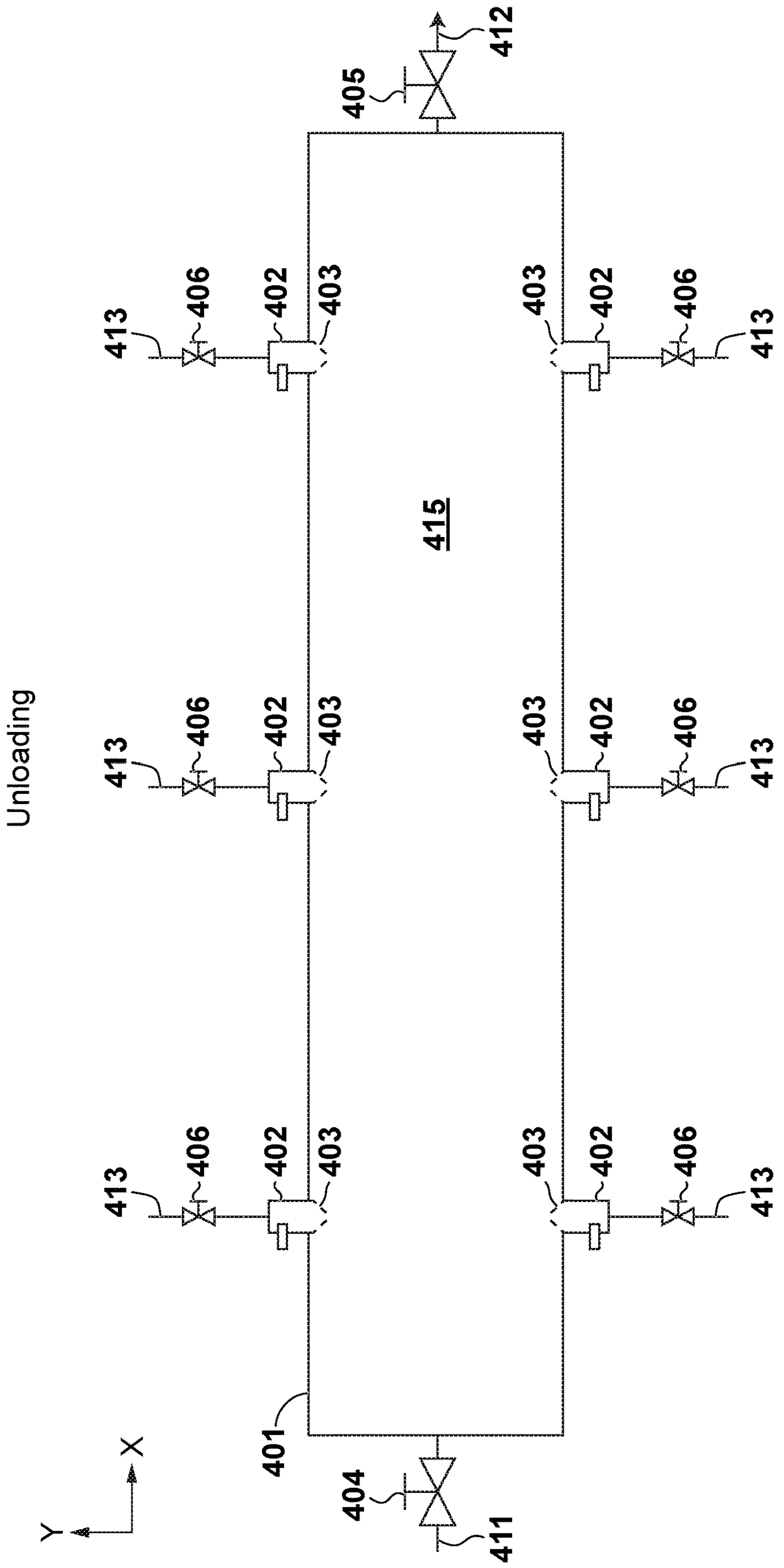
FIG. 4D is a schematic side-on view of the system of FIG. 4A, in an unloading stage.

Turning to FIG. 4C, during a pyrolysis stage, due to the increase in temperature and pressure of feedstock gas 411 that took place during the mixing stage, at least a portion of feedstock gas 411 dissociates into hydrogen, solid carbon, and other gases to form products 426. At the end of the pyrolysis stage, mixing chamber 401 contains unreacted feedstock 411 and products 426 to form a mixture 415.

Subsequently, during an unloading stage (FIG. 4D), outlet valve 405 is opened and a portion of mixture 415 is expelled from mixing chamber 401 due to the pressure difference between the interior of mixing chamber 401 and downstream equipment (not shown). Unloading continues until the pressure in mixing chamber 401 is below the pressure of feedstock 411. At this point, the cycle may be repeated and the loading stage may begin anew.

According to some embodiments, instead of igniting the combustion gas mixture within combustion chambers, the combustion gas may be injected into the mixing chamber at a sufficient speed, and the feedstock gas may be present within the mixing chamber at a sufficiently high temperature, such that spontaneous combustion of the feedstock gas may occur within the mixing chamber.

For example, instead of using discrete combustion chambers as in the case of FIGS. 4A-4D, injectors (for example, injectors similar to fuel injectors used in internal combustion engines) may be used to spray oxidant (e.g. oxygen or air) directly into the constant-volume mixing chamber. The direct injectors may be placed in an opposed configuration to ensure that the streams of oxidant injected into the mixing chamber collide with one another and do not directly impinge on the interior wall of the mixing chamber. According to some embodiments, oxygen may be used as the oxidant and will cause the methane or other feedstock within the mixing chamber to spontaneously ignite if the feedstock is above the corresponding autoignition temperature. Such a system may decrease the system pressures since the oxidant may be more controllably injected into the mixing chamber, since combustion outside of the mixing chamber is not required.

In order to effectively control the amount of oxidant injected into the mixing chamber, the pressure of the oxidant injected into the mixing chamber may need to be at least twice the pressure of the feedstock contained within the mixing chamber to create choked flow conditions. For example, if the desired pressure within the mixing chamber is 60 bar, the fuel delivery system may need to be configured to deliver fuel at 120 bar.

According to some embodiments, when combusting the secondary fluid outside of the mixing chamber, the secondary fluid may comprise a mixture of one or more of: carbon monoxide; methane; hydrogen; oxygen; air; carbon dioxide; and water. According to some embodiments, the secondary fluid may comprise a mixture of one or more of: carbon monoxide; carbon dioxide; and water. When the feedstock gas is designed to auto-ignite or auto-combust upon contact with the fuel (the secondary fluid), then the secondary fluid may comprise an oxidant such as oxygen or air, and the auto-ignition temperature will depend on the type of feedstock. For example, in the presence of air, methane has an auto-ignition temperature of about 850 K (at 1 bar), hydrogen has an auto-ignition temperature of about 770 K (at 1 bar), and carbon monoxide has an auto-ignition temperature of about 880 K (at 1 bar). If the oxidant that is used is pure oxygen, the auto-ignition temperature will vary, as could be determined by a person skilled in the art.

Figure 5:
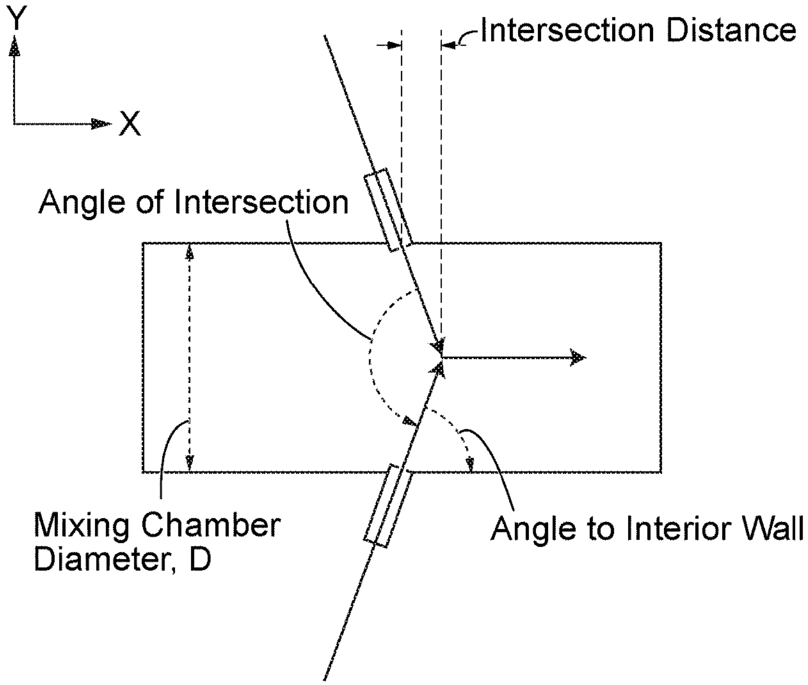
FIG. 5 shows schematic side-on views of systems for mixing a primary fluid with a secondary fluid, according to embodiments of the disclosure.
Figure 5:
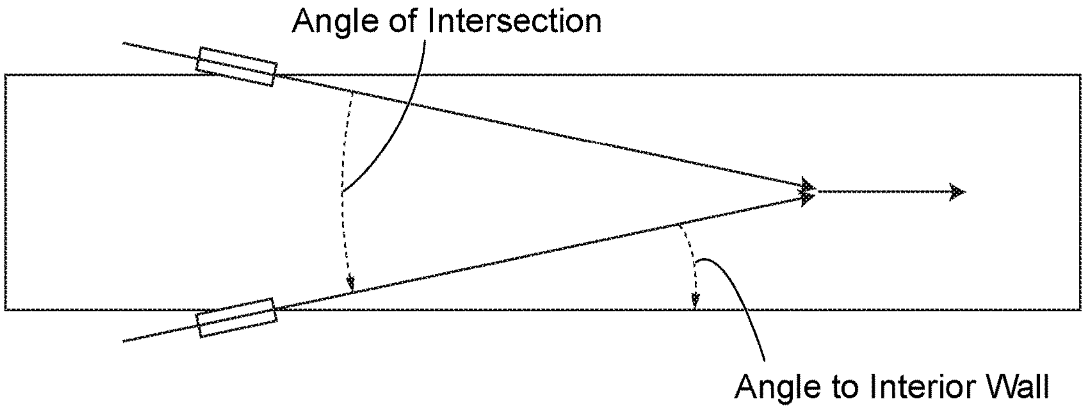

According to some embodiments (as can be seen for instance in FIG. 5), the angle formed by an interior wall of the mixing chamber and an injection direction may range from 5 to 90 degrees. The corresponding angle of intersection formed by two impinging streams of fluid are indicated in the table. The table also indicates the approximate intersection distance of the two streams, the intersection distance being the distance separating a point of intersection of the two streams if the streams impinged one another head-on (forming a 180° angle) and the actual point of intersection of the two streams.

According to some embodiments, the orientation of orifices relative to the longitudinal axis of the mixing chamber is not fixed, and may be adjusted during operation, for example by using pivotable injectors.

The word “a” or “an” when used in conjunction with the term “comprising” or “including” in the claims and/or the specification may mean “one”, but it is also consistent with the meaning of “one or more”, “at least one”, and “one or more than one” unless the content clearly dictates otherwise. Similarly, the word “another” may mean at least a second or more unless the content clearly dictates otherwise.

The terms “coupled”, “coupling” or “connected” as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term “and/or” herein when used in association with a list of items means any one or more of the items comprising that list.

As used herein, a reference to “about” or “approximately” a number or to being “substantially” equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A method of mixing a first fluid with a second fluid, comprising:
- loading, via an inlet valve, a mixing chamber with a first fluid, and then sealing the mixing chamber; and
- while a volume of the first fluid within the sealed mixing chamber is constant:
  - injecting a first stream of the second fluid into the sealed mixing chamber along a first injection direction; and
  - injecting a second stream of the second fluid into the sealed mixing chamber along a second injection direction that intersects the first injection direction,
- wherein, as a result of injecting the first and second streams of the second fluid into the sealed mixing chamber, the first and second streams of the second fluid impinge one another so as to generate within the sealed mixing chamber at least one further stream of the second fluid that mixes with the first fluid and that flows in a direction different to the first and second injection directions.

2. The method of claim 1, wherein the direction of flow of the at least one further stream of the second fluid is perpendicular to the first and second injection directions.

3. The method of claim 1, wherein a volume of the sealed mixing chamber is fixed.

4. The method of claim 1, wherein the first injection direction intersects the second injection direction at an angle of about 180 degrees.

5. The method of claim 1, wherein the sealed mixing chamber defines a longitudinal axis, and wherein the first and second injection directions are perpendicular to the longitudinal axis.

6. The method of claim 5, wherein the first injection direction intersects the second injection direction at an angle of about 180 degrees.

7. The method of claim 1, wherein the first injection direction intersects the second injection direction at an angle of from 10 to 180 degrees.

8. The method of claim 7, wherein the first injection direction intersects the second injection direction at an angle of about 140 to 180 degrees.

9. The method of claim 8, wherein the first injection direction intersects the second injection direction at an angle of about 160 degrees.

10. The method of claim 1, wherein:
- injecting the first stream into the sealed mixing chamber comprises injecting the first stream from a first fluid injector;
- injecting the second stream into the sealed mixing chamber comprises injecting the second stream from a second fluid injector; and
- the method further comprises:
  - injecting from the first fluid injector a third stream of the second fluid into the sealed mixing chamber along a third injection direction; and
  - injecting from the second fluid injector a fourth stream of the second fluid into the sealed mixing chamber along a fourth injection direction that intersects the third injection direction,
- wherein:
- the first injection direction intersects the second injection direction at an angle of about 180 degrees; and
- the third injection direction intersects the fourth injection direction at an angle of from 10 to 180 degrees.

11. The method of claim 10, further comprising:
- injecting from the first fluid injector a fifth stream of the second fluid into the sealed mixing chamber along a fifth injection direction; and
- injecting from the second fluid injector a sixth stream of the second fluid into the sealed mixing chamber along a sixth injection direction that intersects the fifth injection direction,
- wherein:
- the fifth injection direction intersects the sixth injection direction at an angle of from 10 to 180 degrees.

12. The method of claim 1, wherein:
- injecting the first stream into the sealed mixing chamber comprises injecting the first stream from a first fluid injector; and
- injecting the second stream into the sealed mixing chamber comprises injecting the second stream from a second fluid injector,
- and wherein:
- the method further comprises injecting from a third fluid injector a third stream of the second fluid into the sealed mixing chamber; and
- the third fluid injector is adjacent the first fluid injector and spaced from the first fluid injector by a distance of about 2-20 times a diameter of the sealed mixing chamber.

13. The method of claim 12, wherein the distance is about 10 times the diameter of the sealed mixing chamber.

14. The method of claim 1, further comprising:

injecting a third stream of the second fluid into the sealed mixing chamber; and injecting a fourth stream of the second fluid into the sealed mixing chamber, wherein, as a result of injecting the third and fourth streams of the second fluid into the sealed mixing chamber, the third and fourth streams of the second fluid impinge one another so as to generate within the sealed mixing chamber at least one further stream of the second fluid that:

mixes with the first fluid and flows in a direction different to the third and fourth injection directions; and impinges the at least one further stream generated by the impingement of the first and second streams of the second fluid.

15. The method of claim 1, wherein the first fluid comprises a hydrocarbon.

16. The method of claim 15, wherein the hydrocarbon is methane or natural gas.

17. The method of claim 15, wherein the second fluid comprises one or more of: carbon monoxide; methane; hydrogen; oxygen; air; carbon dioxide; and water.

18. The method of claim 15, wherein the second fluid comprises one or more of: carbon monoxide; carbon dioxide; and water.

19. The method of claim 1, wherein:

the first fluid comprises a hydrocarbon;

the second fluid comprises an oxidant; and after loading the sealed mixing chamber with the first fluid and before injecting the first and second streams of the second fluid into the sealed mixing chamber, a temperature of the first fluid is at least a temperature required for autoignition of the first fluid in the presence of the second fluid.

20. The method of claim 19, wherein the oxidant is oxygen or air.

21. The method of claim 19, wherein the first fluid comprises methane, the oxidant is air, and the temperature required for autoignition is at least 850 K.

22. The method of claim 19, wherein the first fluid comprises hydrogen, the oxidant is air, and the temperature required for autoignition is at least 770 K.

23. The method of claim 19, wherein the first fluid comprises carbon monoxide, the oxidant is air, and the temperature required for autoignition is at least 880 K.

24. The method of claim 1, wherein injecting the first and second streams of the second fluid into the sealed mixing chamber comprises:

combusting a combustible gas in one or more combustion chambers connected to the sealed mixing chamber, thereby forming the second fluid; and injecting the first and second streams of the second fluid into the sealed mixing chamber.

25. The method of claim 1, wherein:

injecting the first stream into the sealed mixing chamber comprises injecting the first stream from a first fluid injector;

injecting the second stream into the sealed mixing chamber comprises injecting the second stream from a second fluid injector; and wherein the first and second fluid injectors are offset from one another such that, in response to the first and second streams of the second fluid impinging one another, vorticity is introduced in one or more of the first stream, the second stream, and the at least one further stream of the second fluid to thereby improve mixing of the second fluid with the first fluid.

26. A method of mixing a first fluid with a second fluid, comprising:

loading a mixing chamber with a first fluid;

injecting a first stream of the second fluid into the mixing chamber along a first injection direction; and injecting a second stream of the second fluid into the mixing chamber along a second injection direction that intersects the first injection direction, wherein, as a result of injecting the first and second streams of the second fluid into the mixing chamber, the first and second streams of the second fluid impinge one another so as to generate within the mixing chamber at least one further stream of the second fluid that mixes with the first fluid and that flows in a direction different to the first and second injection directions, wherein:

injecting the first stream into the mixing chamber comprises injecting the first stream from a first fluid injector; and injecting the second stream into the mixing chamber comprises injecting the second stream from a second fluid injector, and wherein:

the method further comprises injecting from a third fluid injector a third stream of the second fluid into the mixing chamber; and the third fluid injector is adjacent the first fluid injector and spaced from the first fluid injector by a distance of about 2-20 times a diameter of the mixing chamber.

* * * * *